(12) United States Patent
Bu et al.

(10) Patent No.: US 8,398,521 B2
(45) Date of Patent: Mar. 19, 2013

(54) MECHANICAL TORQUE CONVERTER

(76) Inventors: Hu Meng Bu, Mulgrave (AU); Xiao Ling Bu, Mulgrave (AU)

( * ) Notice: Subject to any disclaimer, the term of this patent is extended or adjusted under 35 U.S.C. 154(b) by 704 days.

(21) Appl. No.: 12/378,000

(22) PCT Filed: Sep. 26, 2007

(86) PCT No.: PCT/AU2007/001431
§ 371 (c)(1),
(2), (4) Date: Feb. 18, 2009

(87) PCT Pub. No.: WO2008/037013
PCT Pub. Date: Apr. 3, 2008

(65) Prior Publication Data
US 2010/0234165 A1    Sep. 16, 2010

(30) Foreign Application Priority Data
Sep. 26, 2006    (AU) .................................. 2006905327

(51) Int. Cl.
*F16H 3/74* (2006.01)
(52) U.S. Cl. ......... 475/262; 475/266; 475/325; 475/328
(58) Field of Classification Search .................. 475/262, 475/266, 325, 328
See application file for complete search history.

(56) References Cited

U.S. PATENT DOCUMENTS

| | | | | |
|---|---|---|---|---|
| 2,085,668 A | * | 6/1937 | Mueller | 475/328 |
| 2,884,812 A | | 5/1959 | Reis | |
| 3,540,310 A | * | 11/1970 | Preston | 475/298 |
| 3,762,519 A | | 10/1973 | Bentley | |
| 3,939,734 A | * | 2/1976 | Blanchette et al. | 475/262 |
| 4,390,089 A | | 6/1983 | Dalrymple | |
| 4,854,192 A | * | 8/1989 | Churchill et al. | 475/256 |
| 5,263,906 A | | 11/1993 | Antonov | |
| 5,514,044 A | * | 5/1996 | Antonov | 475/257 |
| 5,733,217 A | * | 3/1998 | Naraki et al. | 475/258 |
| 6,581,745 B2 | | 6/2003 | Kanazawa | |
| 2002/0029950 A1 | | 3/2002 | Kanazawa | |

FOREIGN PATENT DOCUMENTS

| | | |
|---|---|---|
| DE | 3407160 | 9/1985 |
| RU | 2114345 | 6/1998 |

* cited by examiner

*Primary Examiner* — Justin Holmes
*Assistant Examiner* — Jacob S Scott
(74) *Attorney, Agent, or Firm* — Snell & Wilmer LLP

(57) ABSTRACT

The invention discloses a mechanical torque converter (100) having a casing (6), an input shaft (2) entering casing (6) and rotatable within the casing (6). An output shaft (5) exits casing (6) and is rotatable within casing (6). A gearbox (1) is located within casing (6) and coupled to input shaft (2). An escapement device (3) is within casing (6) and coupled to gearbox (1) to brake gearbox (1) under low speed and a clutch (4) co-operates with output shaft (5) and gearbox (1).

14 Claims, 11 Drawing Sheets

MECHANICAL TORQUE CONVERTER

The present invention relates to a mechanical torque converter.

Most torque converters use the principle of a fluid coupling as used in most motor vehicles. The torque ratio of these torque converters is typically 1.9 to 2.5 and the transmission loss ratio can be as high as 10%. Once the fluid torque converter stalls, its efficiency will drop dramatically. As a result, the petrol consumption of the car will increase, typically 9% or more. In addition, a torque converter must be configured with a hydraulic pump, a converter regulator together with a precision electronic and hydraulic control system. Accordingly, typical hydraulic torque converters are complicated, heavy, have a high failure rate, expensive and difficult to manufacture.

It is an object of the invention to provide a torque converter which is less complicated to construct and more reliable.

A further object of the invention is to provide a torque converter which has increased transmission efficiency over conventional fluid coupling torque converters.

With these objects in view the present invention provides a mechanical torque converter including a casing, an input shaft entering said casing and rotatable within said casing, an output shaft exiting said casing and rotatable within said casing, a gearbox located within said casing and coupled to said input shaft, an escapement device within said casing and coupled to said gearbox to brake said gearbox under low speed and a clutch co-operating with said output shaft and said gearbox.

Preferably said output shaft is attached to the base of a cup shaped member and said clutch is located within said cup shaped member. In a preferred embodiment said clutch includes at least a first clutch plate secured to said cup member and at least a second clutch plate rotatable with said input shaft. Preferably said clutch is operable under the force applied by a plurality of balls which presses against a further clutch plate in contact with said at least said second clutch plate and such force varies with the rotational speed of said output shaft under centrifugal force.

It is preferred that each of said plurality of balls are located in a respective groove on the inside of the base of said cup member and the depth of the respective grooves increases in depth towards the center of said base member.

In a practical embodiment said cup shaped member has an inner annulus which defines a chamber for said clutch. An inner gear ring may be located on the inside of said cup shaped member and will engage with said gearbox. The gearbox is preferably a planetary type gearbox with said inner gear ring being the ring gear of said planetary type gearbox. Said planetary type gearbox includes a sun gear on said input shaft, a plurality of planet gears meshing with said sun gear and rotatable within a planet gear carrier and a plurality of supplementary gears rotatable within said planet gear carrier and meshing with a respective one of said plurality of planet gears and said plurality of supplementary gears meshing with said ring gear. Said escapement in a practical embodiment includes the planet gear carrier of said planetary type gearbox and a cone shaped brake hoop which is axially movable relative to said planet gear carrier to contact the inside of said casing.

Said cone shaped brake hoop preferably contacts a ring shaped brake strip on the inside of said housing. The brake hoop is spiral keyed to said planet carrier and can move axially with respect to said planet gear carrier on rotation of said planet gear carrier. The brake hoop is preferably resiliently biased with respect to said planet gear carrier. The planet gear carrier may include a pair of spaced apart opposed holders which are assembled together. The brake hoop is preferably spiral keyed to one of said holders and is resiliently biased by spring blades on said one of said holders. A seal is typically provided between said one of said holders and said ring gear. The inner annulus may be frictionally engageable by said clutch.

As the invention uses purely mechanical integers improvements in acceleration performance, fuel economy and smoothness of pick-up are realized. The invention is safer in operation and relatively lower in manufacturing cost. The construction allows the clutch to transmit the power with a flexible connection. It also provides detection and sensing of the change in the load and controls the operating status of the escapement, so as to control the automatic torque variation of the gearbox. The output shaft will transmit the output dynamic torque from the gearbox to the load. The invention will realize a flexible connection of torque transmission between the power source and the load. It will automatically adjust the output torque according to the change in the load, so that the power source and the load reach the best matching of torque. The invention can be applied to any source of power e.g. electric motor, internal combustion engine, etc. If the invention is applied to a car engine, then the gradual speed-up as the car moves away allows the invention to automatically increase the torque to output enough power to drive the car and overcome the resistance from the stationary inertia of the car. When the car reaches a certain speed, the invention can transmit 100% of the engine's power to the gearbox. Whilst driving the invention can automatically vary the torque as per the change of the car load, so as to let the engine's output power create the maximum result.

The structure and functional features of a preferred embodiment of the present invention will become more apparent from the following detailed description when taken in conjunction with the accompanying drawings, in which.

Figure 1:
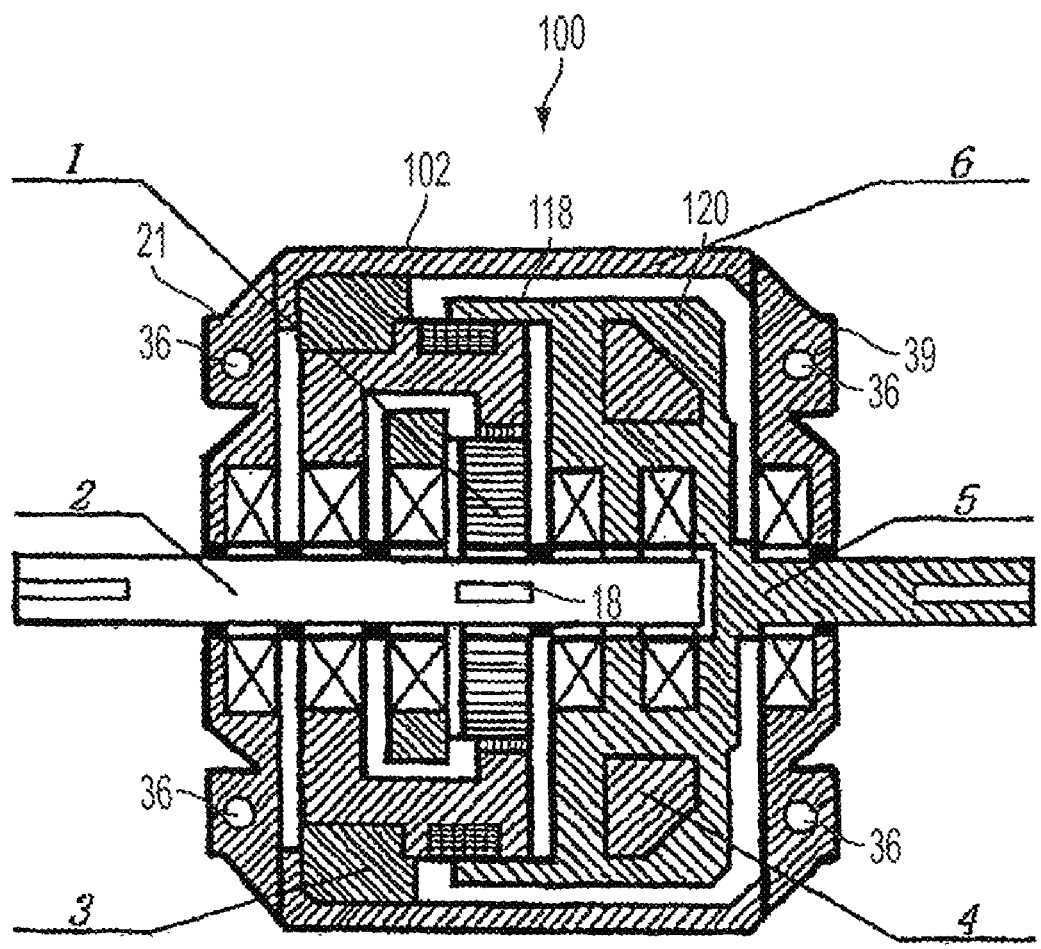
FIG. 1 is a simplified cross-sectional schematic view of a mechanical torque converter made in accordance with a preferred embodiment of the invention.
Figure 2:
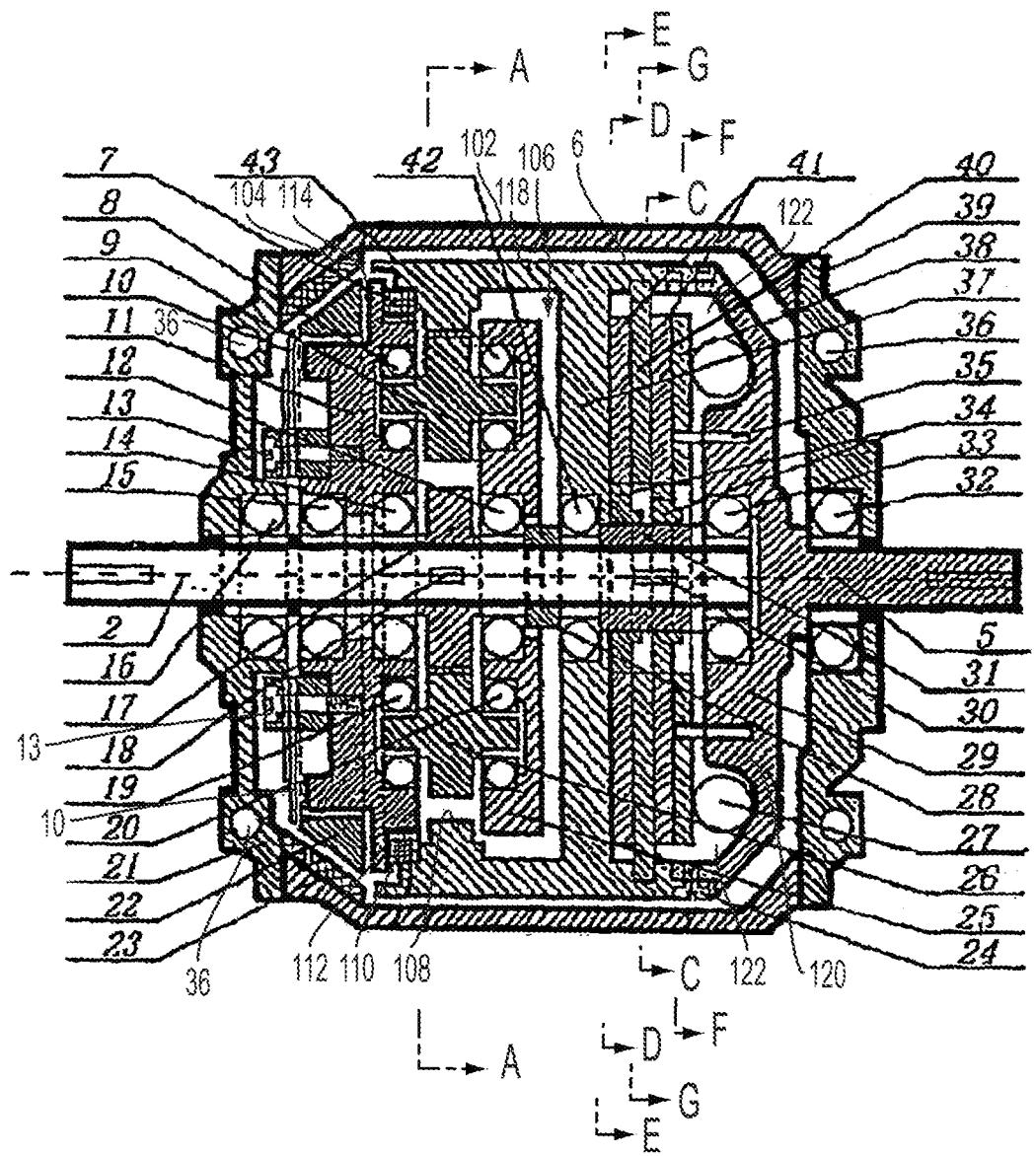
FIG. 2 is a detailed cross-sectional view of the mechanical torque converter shown in FIG. 1.
Figure 3:
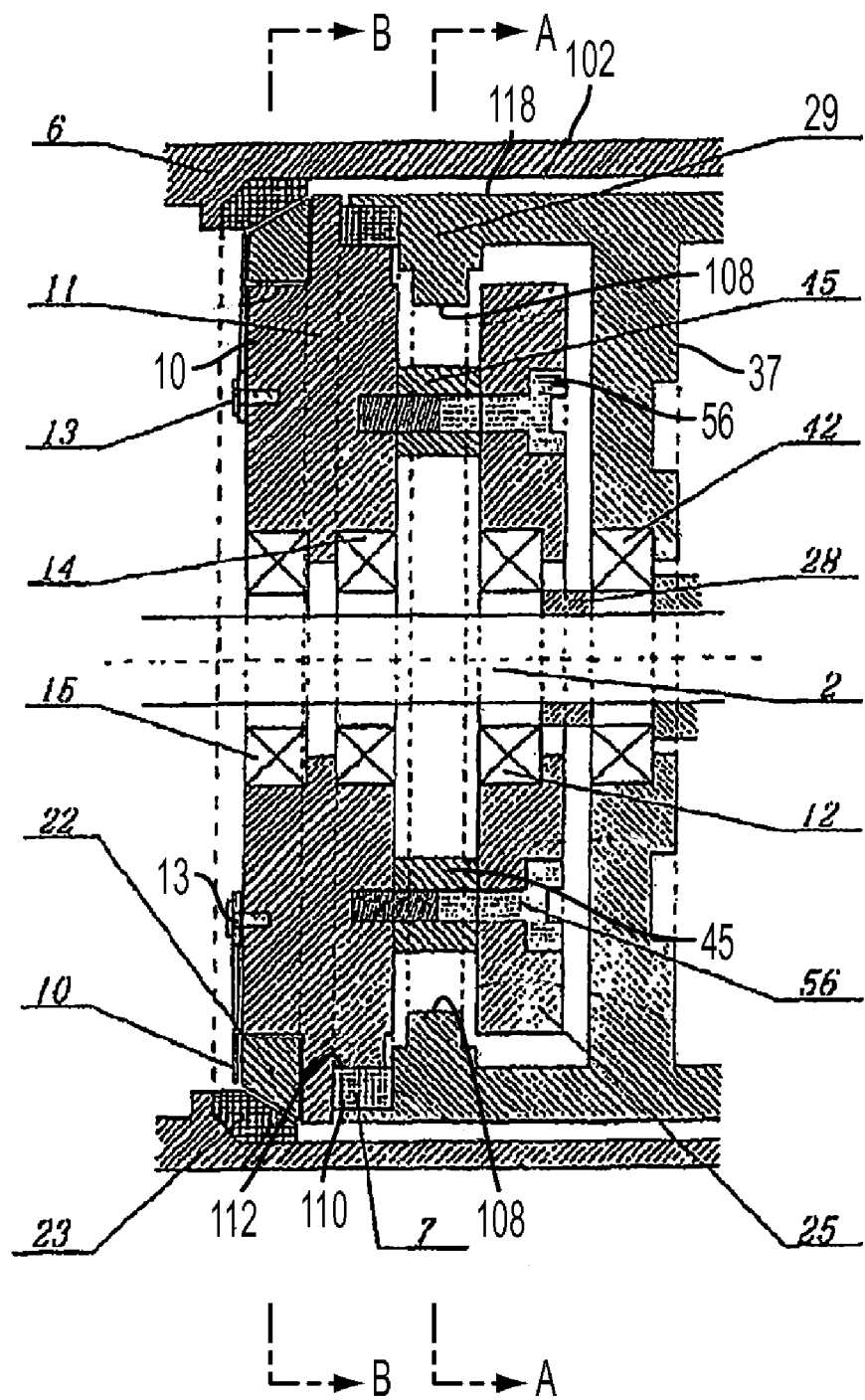
FIG. 3 is a detailed cross-sectional view similar to that of FIG. 2 showing the front end of mechanical torque converter.
Figure 4:
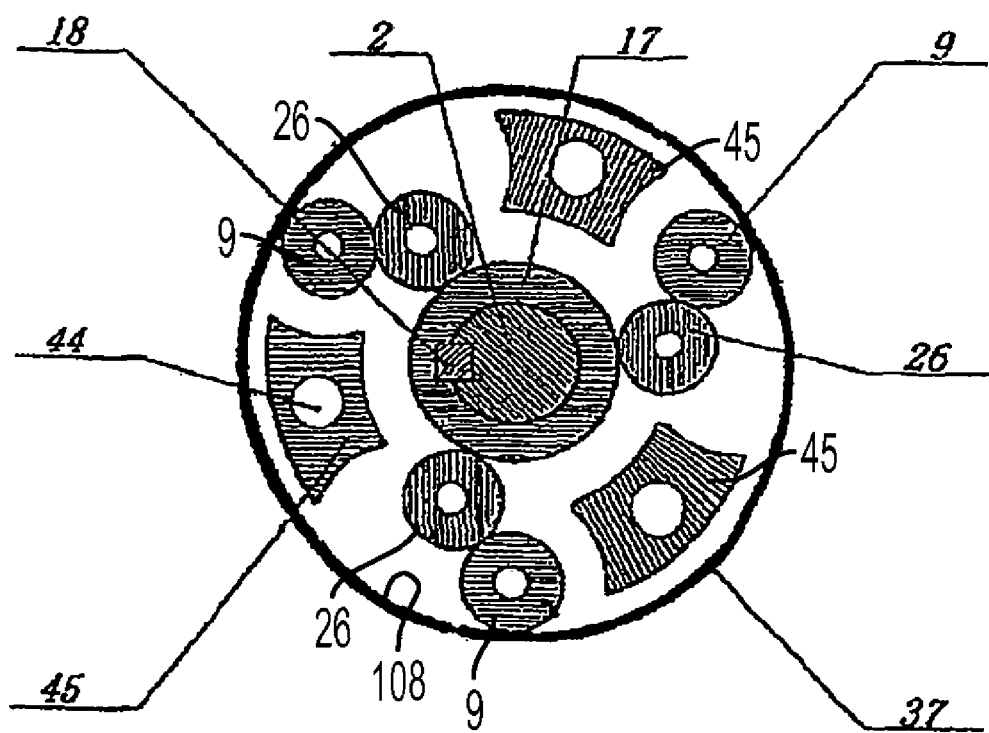
FIG. 4 is a cross-sectional view along and in the direction of arrows A-A in FIG. 3 of the gearbox of the mechanical torque converter.
Figure 5:
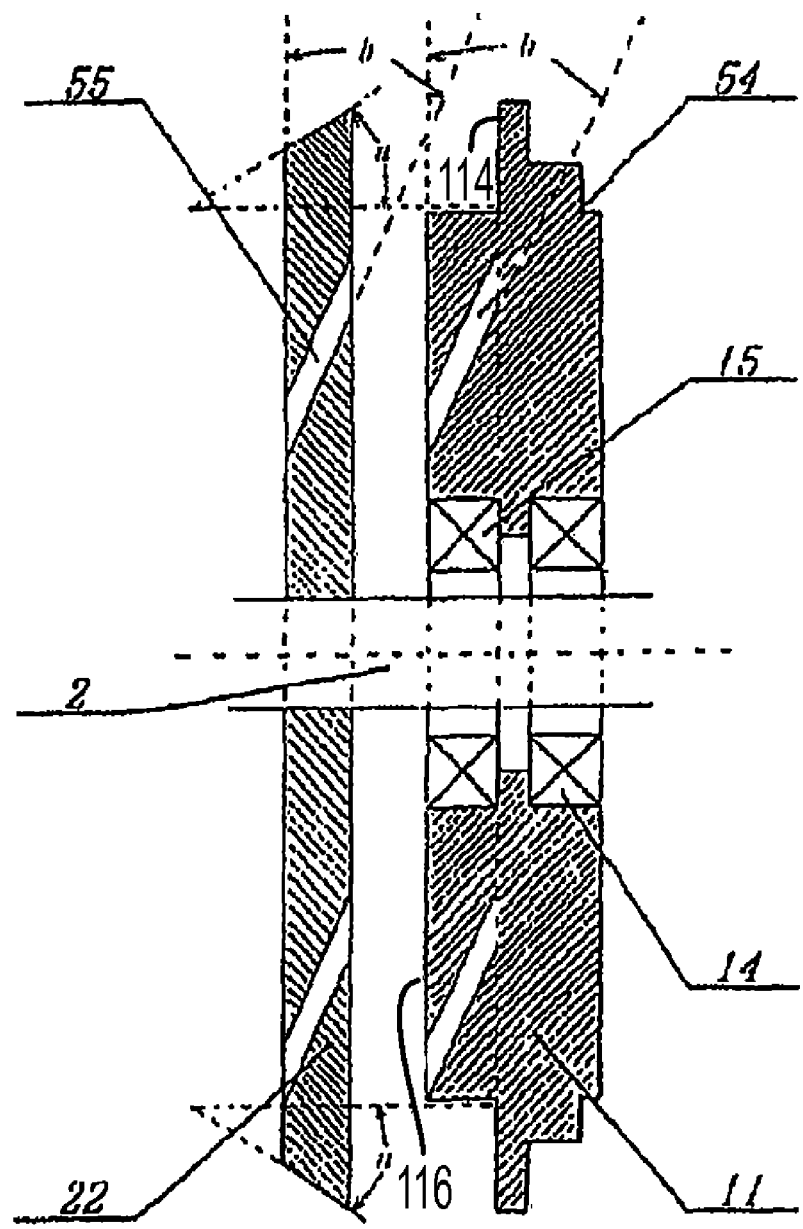
FIG. 5 is an exploded cross-sectional view similar to that of FIG. 3 showing the escapement used in the mechanical torque converter.
Figure 6:
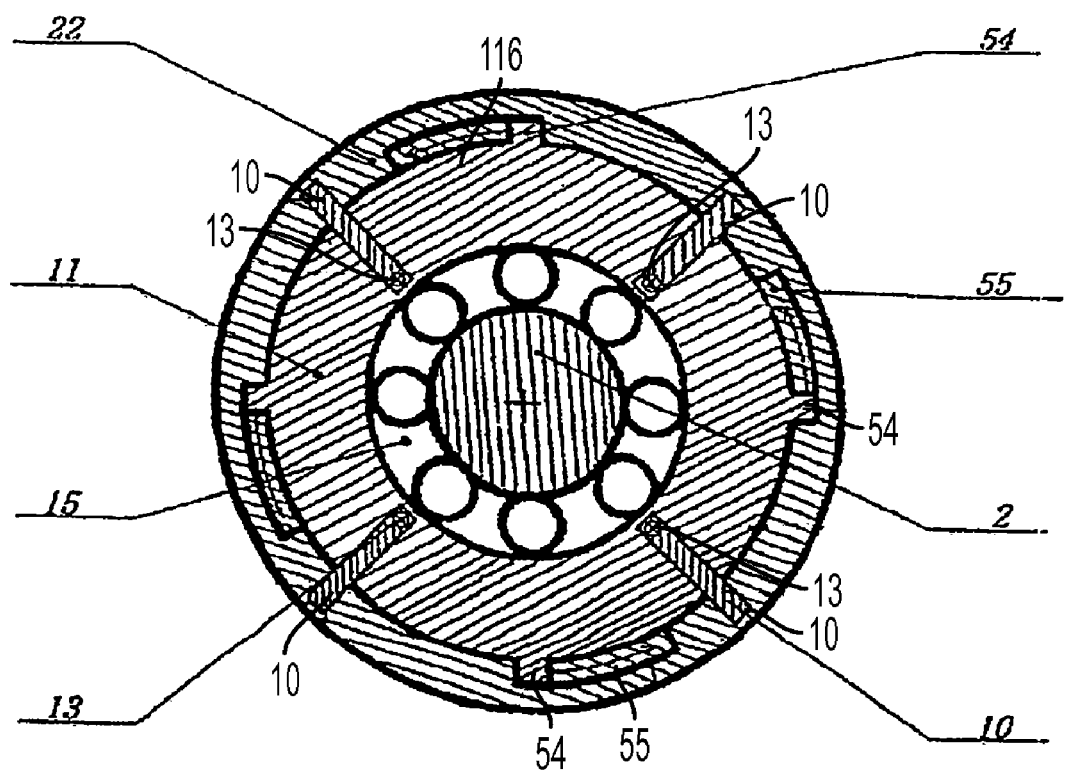
FIG. 6 is a cross-sectional view along and in the direction of arrows B-B in FIG. 3 of the escapement shown in FIG. 5.
Figure 7:
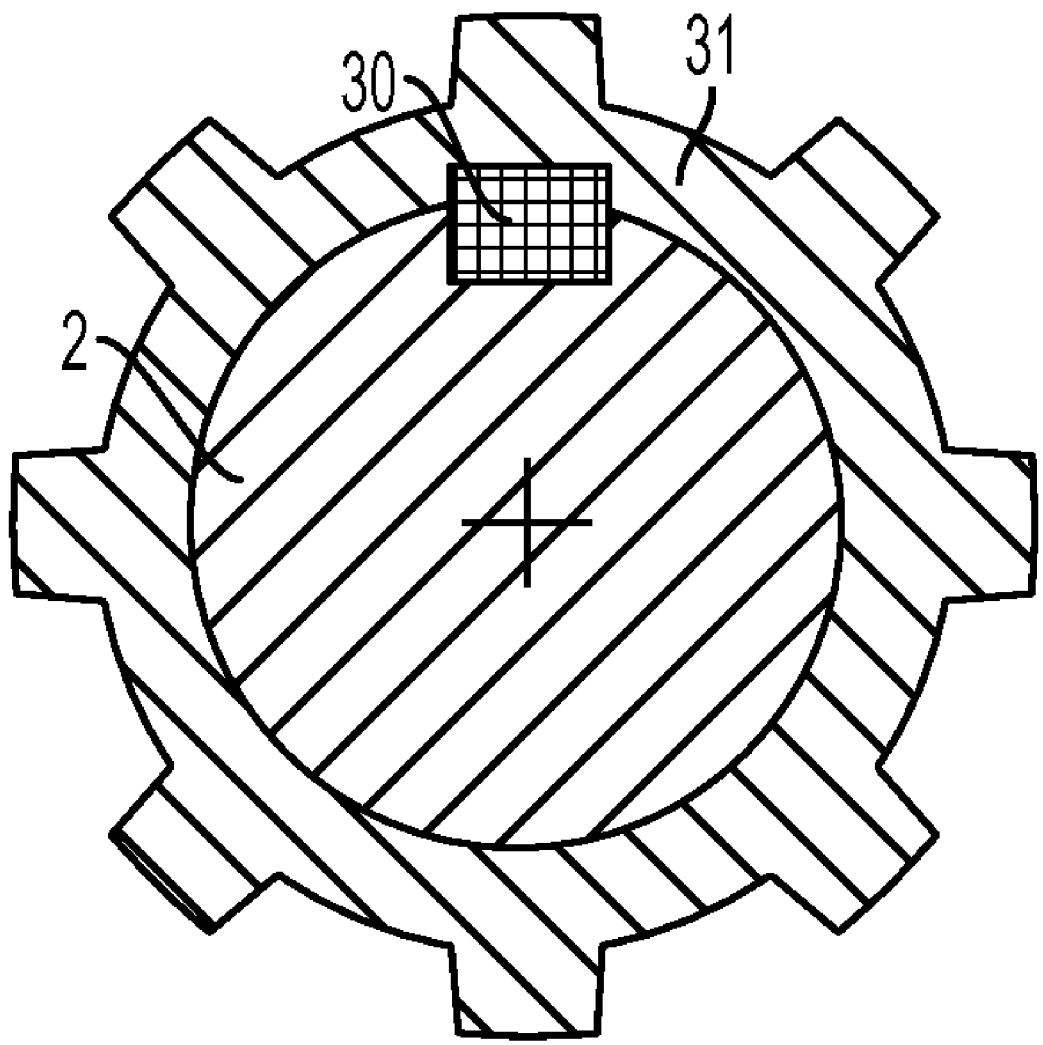
FIG. 7 is a cross-sectional view along and in the direction of arrows C-C in FIG. 2 of the inner spline sleeve.
Figure 8:
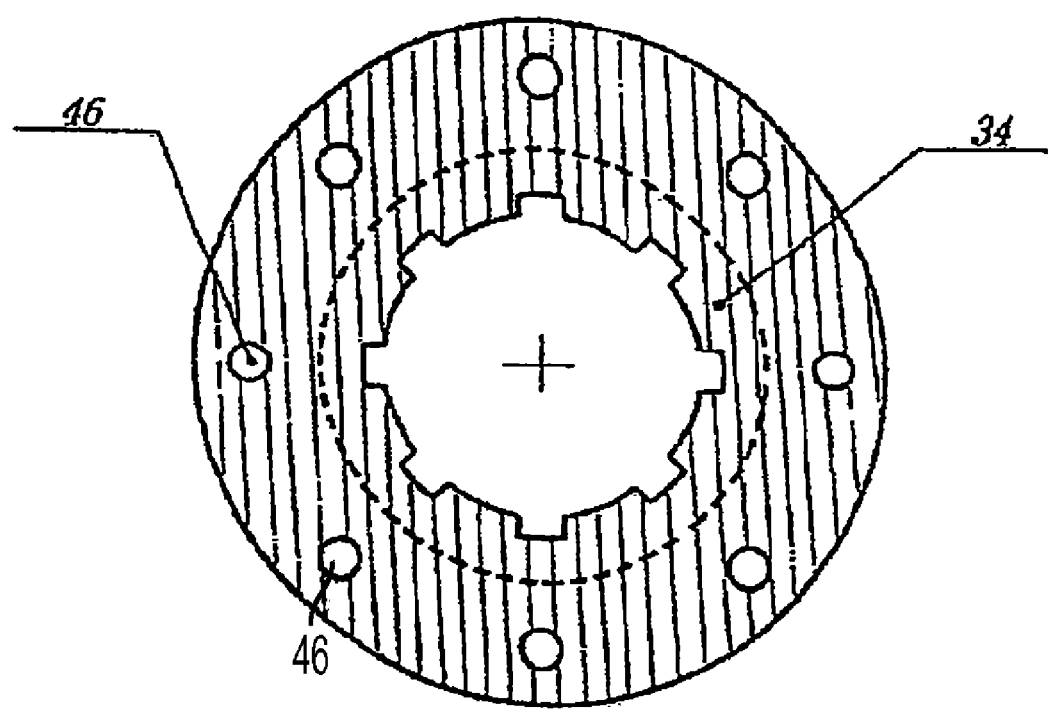
FIG. 8 is a cross-sectional view along and in the direction of arrows D-D in FIG. 2 of the outer spline sleeve.
Figures 9, 10:
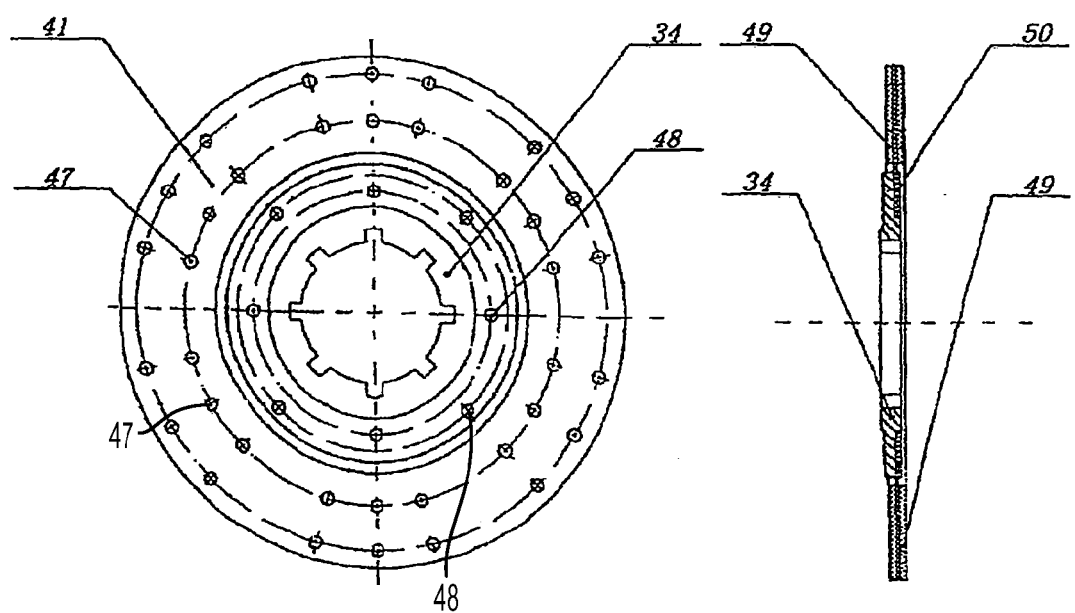
FIG. 9 is a cross-sectional view along and in the direction of arrows E-E in FIG. 2 of the active friction plate.
FIG. 10 is a side view of the active friction plate shown in FIG. 9.
Figure 11:
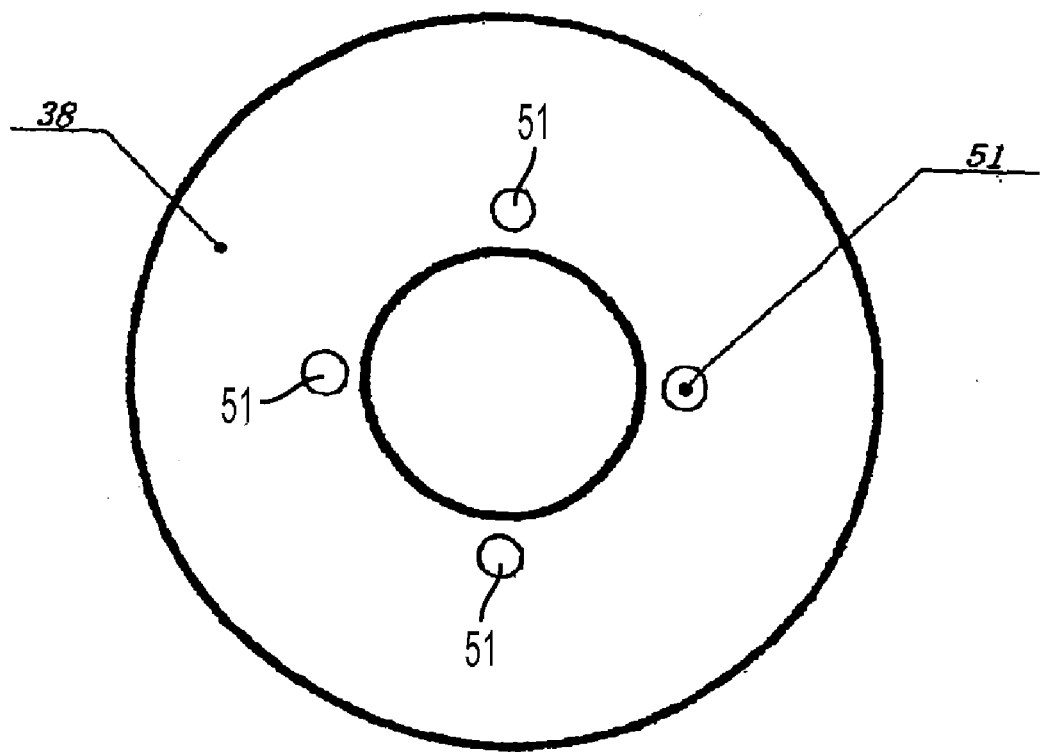
FIG. 11 is a cross-sectional view along and in the direction of arrows F-F in FIG. 2 of the pressure disk.
Figure 12:
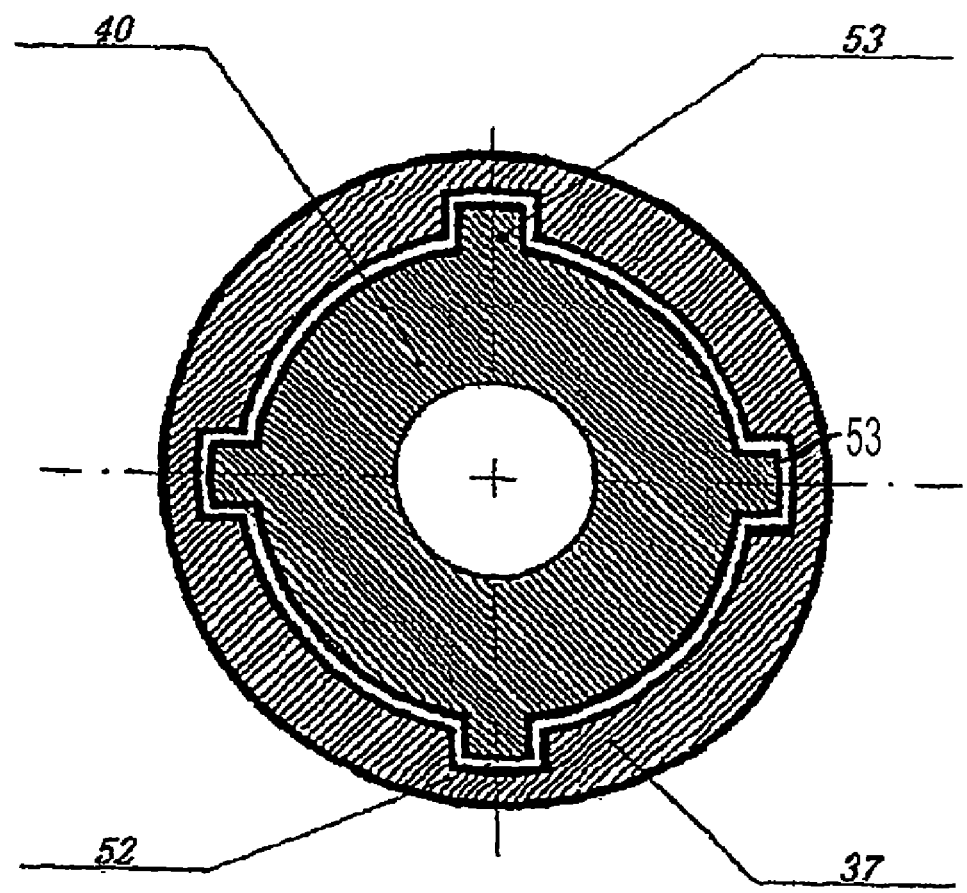
FIG. 12 is a cross-sectional view along and in the direction of arrows G-G in FIG. 2 of the driven friction plate.

In FIG. 1 there is shown a simplified view of a torque converter 100 made in accordance with the invention. The major components of the torque converter 100 are a gearbox 1 which is coupled to a driven input shaft 2. The input shaft 2 can be driven by an internal combustion engine, electric motor or any other type of motor or rotation device. The control of the torque converter is through an escapement 3 and a clutch 4. Clutch 4 is adapted to be coupled to output shaft 5. All components are assembled into a main housing 6 which contains the escapement 3 and clutch 4. The particular construction of the preferred embodiment is shown in FIGS. 2 to 12.

Main housing 6 includes a substantially cylindrical shell 102 which is sealed at either end by end plates 21, 39. Mounting holes 36 allow the torque converter 100 to secured by fastening means (not shown), for example, bolts to a structure (not shown). The ends of cylindrical shell 102 are angled inwardly to provide an inturned lip 104 on which a ring shaped brake strip 23 can be affixed. Bearings 16 and 32 are provided at each end for supporting the input shaft 2 and output shaft 5 respectively.

Gearbox 1 in this embodiment is a planetary type gearbox which includes a sun gear 17 which is secured to input shaft 2 by key 18. Sun gear 17 meshes with planet gears 26 supported by bearings 19, 20 found in planet gear carrier 106. Planet gears 26 in turn mesh with supplementary gears 9 supported by bearings 8, 43 also found in planet gear carrier 106. The planetary type gearbox is completed by ring gear 108. Ring gear 108 forms part of a cup shaped member 29 which is secured to output shaft 5. Planet gear carrier 106 comprises opposing circular holders 11, 25 rotatable about input shaft 2 through bearings respective bearings 14, 15, 12. Bolts 56 join opposing circular holders 11, 25 into an integral unit through spacers 45. A washer 28 is fitted to input shaft 2 to restrict movement of planet gear carrier 106. A ring shaped oil seal 7 is installed in a recess 110 in cup shaped member 29 and a groove 112 in circular holder 11. Lubricating grease can be inserted in the cavity formed inside the cup shaped member 29.

The escapement 3 includes the ring shaped brake strip 23 which can react with the cone shaped brake hoop 22 which can move axially from peripheral groove 114 of circular holder 11. The cone shaped brake hoop 22 has four spiral slots 55 on its inner surface which mate with four corresponding spiral keys 54 on the outer surface of reduced section 116 of circular holder 11. This mating will allow the cone shaped brake hoop 22 to move axially forwards and backwards relative to circular holder 11 to allow contact with ring shaped brake strip 23. In order to provide controlled movement of cone shaped brake hoop 22 a set of spring blades 10 are secured to circular holder 11 by screws 13.

Clutch 4 uses friction plates contained within cup shaped member 29. Cup shaped member 29 has an annulus 37 located therein and is rotatable about input shaft 2 through bearing 42 and through bearing 33 in the base 120 of cup shaped member 29. Cup shaped member 29 in this embodiment is formed as a two part construction with a cylindrical sleeve 118 attached to base 120 using threaded fasteners 24. The inner spline sleeve 31 is concentrically fixed onto the input shaft 2 through the sleeve key 30. A pair of active friction plates 41 are dynamically sleeved onto an inner spline sleeve 31 through their outer spline sleeves 34. The active friction plates 41 include a base plate 50, friction plates 49 and the outer spline sleeve 34. In construction, base plate 50 and the friction plates 49 are bonded together with base plate rivets 4 7. The base plate 50 and the outer spline sleeve 34 are rivet bonded together through spline sleeve rivet holes 46 with spline sleeve rivets 48. A driven friction plate 40 is mounted through outwardly extending teeth 53 which mate with co-operating grooves 52 on the inner wall of cylindrical sleeve 118. A supplementary disc 38 is coupled to base 120 of the cup shaped member 29 through apertures 51 in supplementary disc 39 with pins 35 of base 120. Steel balls 27, typically 40 mm in diameter, are located between the supplementary disc 38 and base 120 of cup shaped member 29 in spiral grooves 122 on the inside of base 120. Spiral grooves 122 have a increasing depth towards the center of base 120.

The operation of the invention will now be described. At start up, clockwise rotation of input shaft 2 allows the sun wheel 17 to run synchronously in the same direction. The planet gears 26 meshed with sun wheel 17 will run anticlockwise. The supplementary gears 9 will rotate clockwise. However, annulus 37 engaging with supplementary gears 9 through ring gear 108 and the cup shaped member 29 together with output shaft 5 connected thereto cannot rotate due to the resistance from the load. As a result, the opposing circular holders 11, 25 are forced to rotate anticlockwise as a whole. The stationary cone shaped brake hoop 22 starts to shift to the left at high speed under the action of its spiral slots 55 and spiral keys 54 of circular holder 11. The close friction between the cone shaped brake hoop 22 and the ring shaped brake strip 23 brakes the unit of the opposing circular holders 11, 25. The escapement 3 is thus under brake control. The output shaft 5 through ring gear 108 and supplementary gears 9 start to reduce the speed, increase the torque and rotate clockwise, driving the load to start up and gradually increasing speed when overcoming the resistance. When the increased torque from the output shaft 5 drives the load at an increased rotating speed, balls 27 shift position under the centrifugal force along grooves 122 on base 120 and press the supplementary disc 38. The supplementary disc 38 then presses the active friction plates 41 and the driven friction plates 40 to the left. The frictional forces through engagement of the disc 38 and plates 40, 41 and the right side of annulus 37 increase gradually. When the balls 27 shift further outwardly they further increase the friction force of the clutch 4 and input shaft 2 transmits the power through the clutch 4 to the output shaft 5 indirectly. When the input shaft 2 and the output shaft 5 rotate synchronously, the complete unit of the opposing circular holders 11, 25 change from anticlockwise rotation to clockwise rotation. Under the action of the their spiral slots 55), spiral keys 54 and spring blades 10, the circular holder 11 and the cone shaped brake hoop 22 shift to the right at high speed and disengage the cone shaped brake hoop 22 from the ring shaped brake strip 23. Accordingly, escapement 3 is in its released mode. The clutch 4 indirectly locks up input shaft 2 and output shaft 5 and provides torque converter 100 into a 1:1 torque transmission status.

When the cup shaped member 29 reduces speed on account of a too heavy load or speed reduction at the power input end, the centrifugal force of balls 27 will reduce. The friction force of clutch 4 will reduce gradually. Once there is a difference in the rotation speed between the input shaft 2 and the output shaft 5, the unit of the opposing circular holders 11, 25 starts to rotate anticlockwise. The cone shaped brake hoop 22 and the circular holder 11 will again shift to the left at high speed under the co-operating of spiral slots 55 and spiral keys. The friction between the cone shaped brake hoop 22 and the ring shaped brake strip 23 again breaks the unit of the opposing circular holders 11, 25. The escapement 3 again comes under brake control status. Accordingly, the annulus 37 engaged by ring gear 108 to supplementary gears 9 will drive the output shaft 5 will start to drive the load clockwise again at a reduced speed and increased torque.

The invention can be coupled to any motor whether an internal combustion engine, electric motor, wind turbine or other suitable rotation device. The device operates without any electronic control or use of hydraulics. It is very energy efficient and less prone to require expensive maintenance. If maintenance is required, it is relatively easy to disassemble. The preferred embodiment can provide a torque ratio between 2.1 and 13.7. Its transmission efficiency can be as high as over 98%.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A mechanical torque converter comprising:
a casing;
an input shaft entering said casing and rotatable within said easing;
an output shaft exiting said casing and rotatable within said casing, said output shaft attached to a base of a cup shaped member;
a planetary type gearbox located within said easing and coupled to said input shaft;
a ring gear of said planetary type gearbox located on an inside of said cup shaped member;
an escapement device located within said casing and coupled to said planetary type gearbox to brake said planetary type gearbox based on a reaction torque from said output shaft transferred via said cup shaped member, said escapement device including a planet gear carrier of said planetary type gearbox and a cone shaped brake hoop which is axially movable relative to said planet gear carrier to contact an inside of said casing to brake said planetary type gearbox; and
a clutch coupled to said input shaft and located in and coupled to said cup shaped member and configured to transfer a force from said input shaft to said output shaft.

2. The mechanical torque converter as claimed in claim 1, wherein said clutch includes at least a first clutch plate secured to said cup shaped member and at least a second clutch plate rotatable with said input shaft.

3. The mechanical torque converter as claimed in claim 2, wherein said clutch is operable under a force applied by a plurality of balls which presses against a third clutch plate in contact with at least said second clutch plate and the force applied by said plurality of balls varies with the rotational speed of said output shaft under centrifugal force.

4. The mechanical torque converter as claimed in claim 3, wherein each of said plurality of balls are located in a respective groove on the inside of said base of said cup shaped member and the depth of said respective grooves increases in depth towards the center of said base.

5. The mechanical torque converter as claimed in claim 1, wherein said cup shaped member has an inner annulus which defines a chamber for said clutch.

6. The mechanical torque converter as claimed in claim 5, wherein said inner annulus is frictionally engageable by said clutch.

7. The mechanical torque converter as claimed in claim 1, wherein said planetary type gearbox includes a sun gear on said input shaft, a plurality of planet gears meshing with said sun gear and rotatable within said planet gear carrier and a plurality of supplementary gears rotatable within said planet gear carrier and meshing with a respective one of said plurality of planet gears and said plurality of supplementary gears meshing with said ring gear.

8. The mechanical torque converter as claimed in claim 7, wherein said cone shaped brake hoop contacts a ring shaped brake strip on the inside of said casing.

9. The mechanical torque converter as claimed in claim 7, wherein said brake hoop is spiral keyed to said planet gear carrier and can move axially with respect to said planet gear carrier on rotation of said planet gear carrier.

10. The mechanical torque converter as claimed in claim 7, wherein said brake hoop is resiliently biased with respect to said planet gear carrier.

11. The mechanical torque converter as claimed in claim 7, wherein said planet gear carrier includes a pair of spaced apart opposed holders which are assembled together.

12. The mechanical torque converter as claimed in claim 11, wherein said brake hoop is spiral keyed to one of said holders and is resiliently biased by spring blades on said one of said holders.

13. The mechanical torque converter as claimed in claim 12, further comprising a seal positioned between said one of said holders and said ring gear.

14. A mechanical torque converter comprising:
a casing;
an input shaft entering said casing and rotatable within said casing;
an output shaft exiting said casing and rotatable within said casing, said output shaft attached to a base of a cup shaped member;
a planetary type gearbox located within said casing and coupled to said input shaft, said planetary type gearbox including a sun gear on said input shaft, a plurality of planet gears meshing with said sun gear and rotatable within a planet gear carrier and a plurality of supplementary gears rotatable within said planet gear carrier and meshing with a respective one of said plurality of planet gears;
a ring gear of said planetary type gearbox located on the inside of said cup shaped member and meshing with said plurality of supplementary gears;
an escapement device located within said casing and coupled to said planetary type gearbox to brake said planetary type gearbox based on a reaction torque from said output shaft transferred via said cup shaped member, said escapement device including said planet gear carrier of said planetary type gearbox and a cone shaped brake hoop which is axially movable relative to said planet gear carrier to contact the inside of said casing; and
a clutch co-operating with said output shaft and said planetary type gearbox, said clutch located within said cup shaped member.

* * * * *